United States Patent [19]

Ulfig et al.

[11] Patent Number: 5,590,586
[45] Date of Patent: Jan. 7, 1997

[54] KITCHEN LAYOUT, SYSTEM

[75] Inventors: Kimberly A. Ulfig, Glen Ellyn; Patricia A. Venetucci, Hawthorn Woods, both of Ill.

[73] Assignee: Restaurant Technology, Inc., Oak Brook, Ill.

[21] Appl. No.: 440,016

[22] Filed: May 12, 1995

[51] Int. Cl.$^6$ .......................... A21D 13/08; A23L 1/31; A47J 37/00; G07F 11/00
[52] U.S. Cl. .................. 99/339; 99/357; 99/484; 99/485; 219/214
[58] Field of Search .................. 99/325–331, 339, 99/340, 357, 403–410, 443 C, 484, 485; 426/274, 275; 364/477, 478, 400; 219/214, 400, 401, 388

[56] References Cited

U.S. PATENT DOCUMENTS

| | | | |
|---|---|---|---|
| 4,650,179 | 3/1987 | Bond | 272/2 |
| 4,812,963 | 3/1989 | Albrecht et al. | 364/400 X |
| 4,919,950 | 4/1990 | Mak | 426/233 |
| 4,944,218 | 7/1990 | Cresson | 99/357 |
| 4,977,823 | 12/1990 | Kuwahara | 99/443 C |
| 4,979,435 | 12/1990 | Hayashi et al. | 99/334 |
| 5,188,020 | 2/1993 | Buchnag | 99/484 X |
| 5,228,382 | 7/1993 | Hayashi et al. | 99/357 X |
| 5,241,899 | 9/1993 | Kuhlman | 99/407 X |
| 5,337,876 | 8/1994 | McGee et al. | 194/236 |
| 5,365,835 | 11/1994 | Naramura | 364/400 X |
| 5,386,762 | 2/1995 | Gokey | 99/326 |
| 5,493,958 | 2/1996 | Naramura | 99/450.5 |

OTHER PUBLICATIONS

Wells Models DABC–1PS and DABC–1TL Equipment Manual, Apr., 1989, pp. 1–7.
Henny Penny Model HC–934DA Equipment Manual, Apr., 1995, pp. 1–6.
Carter–Hoffmann Models MD–110TL and MD–110PS Equipment Manual, Aug., 1994, pp. 1–8.
KES Dual Access Bun Staging Cabinet 6FH05, date unknown.
Layout entitled "B Class Grill & Prep Layout," McDonald's Corporation, Aug. 29, 1994.
Layout entitled "90 Series Grill & Prep Layout," McDonald's Corporation, Aug. 29, 1994.
Layout entitled "Kitchen Equipment Layout," McDonald's Corporation, date unknown.
Layout entitled "Kitchen Equipment," McDonald's Corporation, Apr., 1994.
Layout entitled "90 series High Volume Building," McDonald's Corporation, Mar. 4, 1993.
Layout entitled "Dinner Production Area–D17 Bsmt Original," McDonald's Corporation, Sep., 1990.

*Primary Examiner*—Timothy F. Simone
*Attorney, Agent, or Firm*—Jenner & Block

[57] ABSTRACT

A kitchen layout is provided which includes a plurality of work areas and devices arranged to promote efficient cooking and handling. The kitchen includes a food cooking area for cooking food items which require further processing and assembly into a finished product. The food cooking area contains various food cooking devices, such as a grill, an oven or a fryer. A cooked-food assembly area containing an assembly area is spaced apart from the food cooking area. The cooked food items are assembled into finished products within the cooked-food assembly area in response to customer orders. A cooked-food buffer area is provided intermediate the food cooking area and the cooked-food assembly area and proximally located to both the food cooking area and the cooked-food assembly area. The cooked-food buffer area contains a cooked-food buffer device for holding a supply of cooked food items at elevated temperature for extended periods of time while maintaining the taste, texture and appearance of the food items prior to subsequent processing and assembly. The cooked-food buffer device includes a holding cabinet having a food inlet, a food outlet and an interior for holding food items. The holding cabinet is positioned within the buffer area such that the food inlet provides a passageway from the food cooking area to the interior of the device and the food outlet provides a passageway from the interior of the device to the assembly area.

6 Claims, 3 Drawing Sheets

KITCHEN LAYOUT, SYSTEM

FIELD OF THE INVENTION

This invention relates generally to commercial kitchens and more particularly, to a kitchen layout for a quick service restaurant.

BACKGROUND OF THE INVENTION

Quick service restaurants typically service customers who expect to receive their food quickly, with minimum delay, and with predictable and constant high quality. Moreover, the rate of customer demand can vary widely throughout an operational day, with some periods having an extremely high rate of customer demand. For example, customer demand can be very high at lunch or dinner times or when a large group of customers, such as a tour bus, enters the restaurant. The rate of producing finished, saleable cooked food items, however, is generally fixed and depends on a number of factors: for example, the time required to properly cook a particular food item; the size and number of food cooking devices; the number and efficiency of the kitchen personnel. Consequently, quick service restaurants are frequently faced with a varying rate of customer demand and a limited rate of producing finished, saleable cooked food items where the maximum periodic rate of customer demand can exceed the maximum rate of production.

The difference between the variable customer demand rate and the limited production rate is especially prominent where quick service restaurants provide cooked food items which require processing or assembly after the items have been cooked to produce a finished product for delivery and consumption by a customer. For example, many quick service restaurants provide sandwich-type products that are composed of a bun or other bakery-cooked bread products and a sandwich filling which is cooked at the quick service restaurant, for example, hamburger patties, fish and chicken fillets, which may be breaded, and eggs. Such sandwich-type cooked food items frequently require further processing and assembly after the sandwich fillings have been cooked. The processing and assembly of the sandwich-type products can include transferring the cooked filling to a bun product, and adding condiments such as, for example, cheese, pickles, lettuce, tomatoes, ketchup, mayonnaise or tartar sauce to the bun and filling combination. In addition, the processing and assembly of the sandwich-type products can include toasting the bun or wrapping or packaging the food product. Other cooked food products which require processing and assembly after being cooked include meal-type items. For example, a breakfast meal may be sold as a single product consisting of several individual items such as scrambled eggs, hashbrowns, and sausage. Processing and assembling such a meal-type product involves first cooking the various individual food items and then placing appropriate portions of each item in a suitable container for delivery to customers. Cooked food items requiring further processing and assembly after being cooked thus further complicate the difference between the variable customer demand rate and the limited production rate because the processing and assembly steps can introduce a lag time in the production rate necessary to satisfy demand.

Various attempts have been made to bridge the differences between the varying customer demand rate and the limited production rate. For example, additional personnel and food cooking devices could be utilized to increase the rate of food production by increasing the cooking rate. However, an increased number of cooking devices can cause other problems, including increased space requirements, increased operating expenses, and initial capital requirements.

Alternatively, a number of individual food items could be cooked and assembled in advance of an increase in customer demand, such as, for example, in anticipation of lunch or dinner time. The processed and assembled food items are wrapped or packaged but can be held in advance of a customer order in a heated compartment only for a relatively short predetermined period of time, otherwise food quality and consistency suffers. Thereafter, customer orders can be quickly filled by using the supply of previously assembled cooked food items. However, although pre-processing and pre-assembly of the cooked food items can satisfy a spike increase in the customer demand rate and minimize the difference between such a high rate of customer demand and the fixed cooking rate, pre-processing and pre-assembly can lead to other problems. For example, since the pre-processed and pre-assembled food items can be held for only a relatively short period of time, if the food items are not sold prior to the expiration of that time, the food items must be destroyed, thus leading to an increase in waste and in operating expense for the restaurant. Moreover, in some circumstances preprocessing and pre-assembling the cooked food items can lead to poor consumer perception of the food items even though the food items are properly prepared. For example, if a sandwich-type product requires lettuce in addition to the sandwich filling and bun product, the lettuce may become undesirably warmed and/or wilted after the sandwich has been assembled and is being held in advance of a customer order.

A need therefore exists for a kitchen layout, system, and method of producing cooked food in which food items can be efficiently and effectively cooked at a rate which satisfies a varying rate of customer demand where the rate of customer demand sometimes exceeds the rate of cooking the food items for periods of time, particularly where the cooked food items require further processing after being cooked.

SUMMARY OF THE INVENTION

In accordance with the present invention, a kitchen layout, system, and method are provided for efficiently and effectively producing cooked food items at a rate that satisfies a varying rate of customer demand where the rate of customer demand sometimes exceeds the rate of cooking the food items for periods of time, particularly where the cooked food items require further processing after being cooked.

The kitchen in accordance with the invention includes a plurality of work areas and devices arranged to promote effective and efficient cooked food handling and production. Within the kitchen a primary food cooking area is provided for cooking food items, such as hamburger patties, which require further processing and assembly after being cooked. Accordingly, the food cooking area contains various food cooking devices, such as a grill, an oven or a fryer. In addition, the food cooking area can contain a freezer for storing the food items to be cooked.

The kitchen also includes a cooked-food assembly area for further processing and assembling the cooked food items into finished food products. The cooked-food assembly area is and can include an elongated assembly table where the cooked food items are processed and assembled.

The kitchen also includes a cooked-food buffer area which is intermediate the food cooking area and the cooked-food assembly area and which is proximally located to both the food cooking area and the cooked-food assembly area. The buffer area contains a cooked-food buffer or staging device which is used to hold a supply of food items after the food items have been cooked in the food cooking area and before the cooked food items are further processed and/or assembled in the cooked-food assembly area. Usually, the cooked food items are sandwich fillings and are held at elevated temperatures in the buffer device. In one embodiment, the buffer device includes a cabinet having a food inlet, a food outlet, and an interior for holding cooked food items. The buffer device is positioned within the buffer area such that the food inlet provides a passageway for personnel working in the food cooking area to insert cooked food items into the interior of the device and the food outlet provides a passageway for personnel working in the cooked-food assembly area to remove food items from the interior of the device. The cooked food items are held within the buffer device, until sold or otherwise disposed of, under conditions which maintain the taste, texture, and appearance of the food items. Preferred buffer or cooked food holding devices for use in accordance with the invention are disclosed in U.S. patent application Ser. No. 08/439,160 filed may 11, 1995, entitled "Cooked Food Staging Device and Method" filed concurrently with this application, the entire disclosure of which is hereby incorporated by reference.

In accordance with another aspect of the invention, the cooking devices in the food cooking area are linearly arranged in side-by-side relation and are positioned to face the food inlet of the buffer device. This arrangement promotes efficient cooking by providing ready access to adjacent cooking devices. In addition, because the cooking devices face the food inlet of the buffer device, the cooked food items are readily transferred from the food cooking area to the buffer device.

In accordance with another aspect of the invention, the elongated assembly table within the cooked-food assembly area is arranged so that one table end faces the food outlet of the buffer device. At least one food cooking device or devices, buffer device and assembly table are linearly arranged. Thus, these components can be linearly positioned within a straight or linear corridor extending along the length of the table and through the buffer device to at least one of the food cooking devices within the food cooking area. This linear arrangement further promotes efficient cooking and food handling because the food items are handled and transported in a logical and efficient flow from cooking to buffer to assembly, via the food buffer outlet to the assembly table.

In accordance with another aspect of the invention, a method is provided for producing finished cooked food items at a rate which depends on the customer demand rate where the maximum customer demand rate can exceed the maximum cooking rate. Initially, a supply of cooked food items is cooked in advance of customer orders. The cooked food items are then stored in a buffer device at an elevated temperature for a period of time while maintaining the taste, texture, and appearance of the cooked food items. By storing the cooked food items in this manner, it is possible to obtain a supply of cooked food items needed to meet a surge in the customer demand rate that exceeds the rate of cooking. Thereafter, when an order for a portion of the cooked food items stored in the buffer device is received, the ordered portion of the cooked food items is transferred from the buffer device to the cooked-food assembly area where the ordered portion is processed and assembled into a finished product. Finally, the finished product is delivered to the customer.

DETAILED DESCRIPTION

Figure 1:
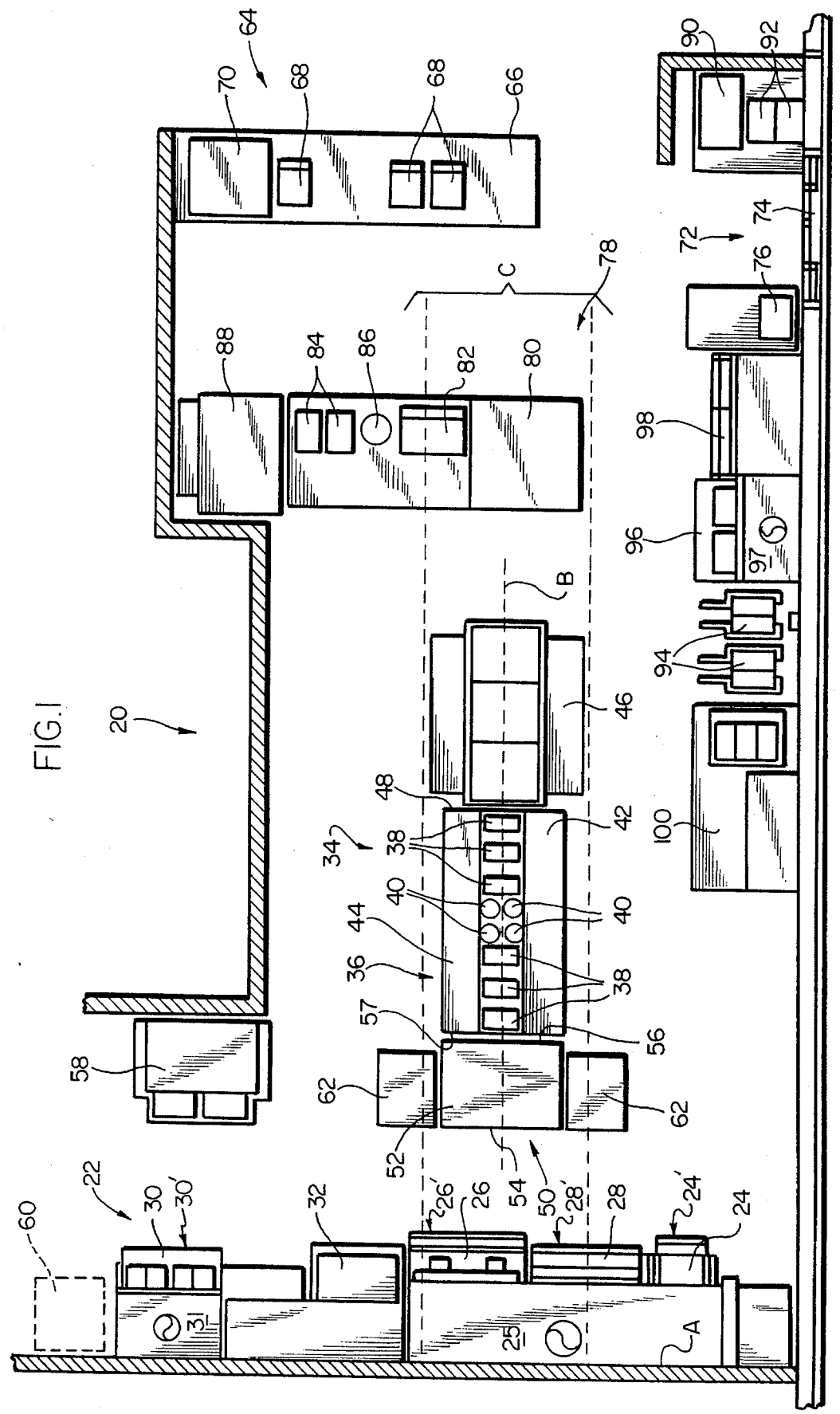
FIG. 1 is a plan view of one embodiment of a kitchen according to the invention.

Turning now to the drawings in which like reference numerals indicate like elements throughout, FIG. 1 is a plan view of a preferred embodiment of a kitchen 20 according to the invention. Within kitchen 20 a primary food cooking area 22 is provided for cooking food items, such as sandwich-type products, which require further processing and assembly after being cooked. Food cooking area 22 contains various food cooking devices 24, 26, 28 and 30 useful for cooking a variety of food items. For example, fryer 30 can be used to produce cooked food items which require deep frying, such as breaded chicken and fish fillets. Moreover, grills 24, 26 and 28 are provided for cooking food items, such as hamburgers, which can be cooked on a heated surface. In the preferred embodiment, grill 24 is a ½ clamshell grill for cooking relatively thick food items and grill 26 is a full clamshell grill for cooking relatively thin food items. Suitable grills include those described in U.S. Pat. Nos. 4,586,428 and Re.32,994. In addition, flat grill 28 can be used to cook food items such as eggs. An oven can also be included in food cooking area 22 for producing food items requiring cooking within an enclosed container. Food cooking area 22 can also include a freezer 32 for holding some food items, such as hamburgers and chicken fillets, before the food items are cooked. Freezer 32 helps to promote efficient food handling by ensuring that a supply of food items to be cooked is readily available to personnel working within area 22. In the preferred embodiment, food cooking devices 24, 26, 28 and 30 as well as freezer 32 are positioned along a line A as shown in FIG. 1 resulting in a linear arrangement. Such a linear arrangement of devices 24, 26, 28, 30 and 32 also promotes efficient cooking by providing ready access to adjacent devices, such as grills 24 and 28. Devices 24, 26, 28 and 30 each have a front portion 24', 26', 28' and 30' that faces food inlet 54 of buffer device 52, hereinafter described.

Figure 2:
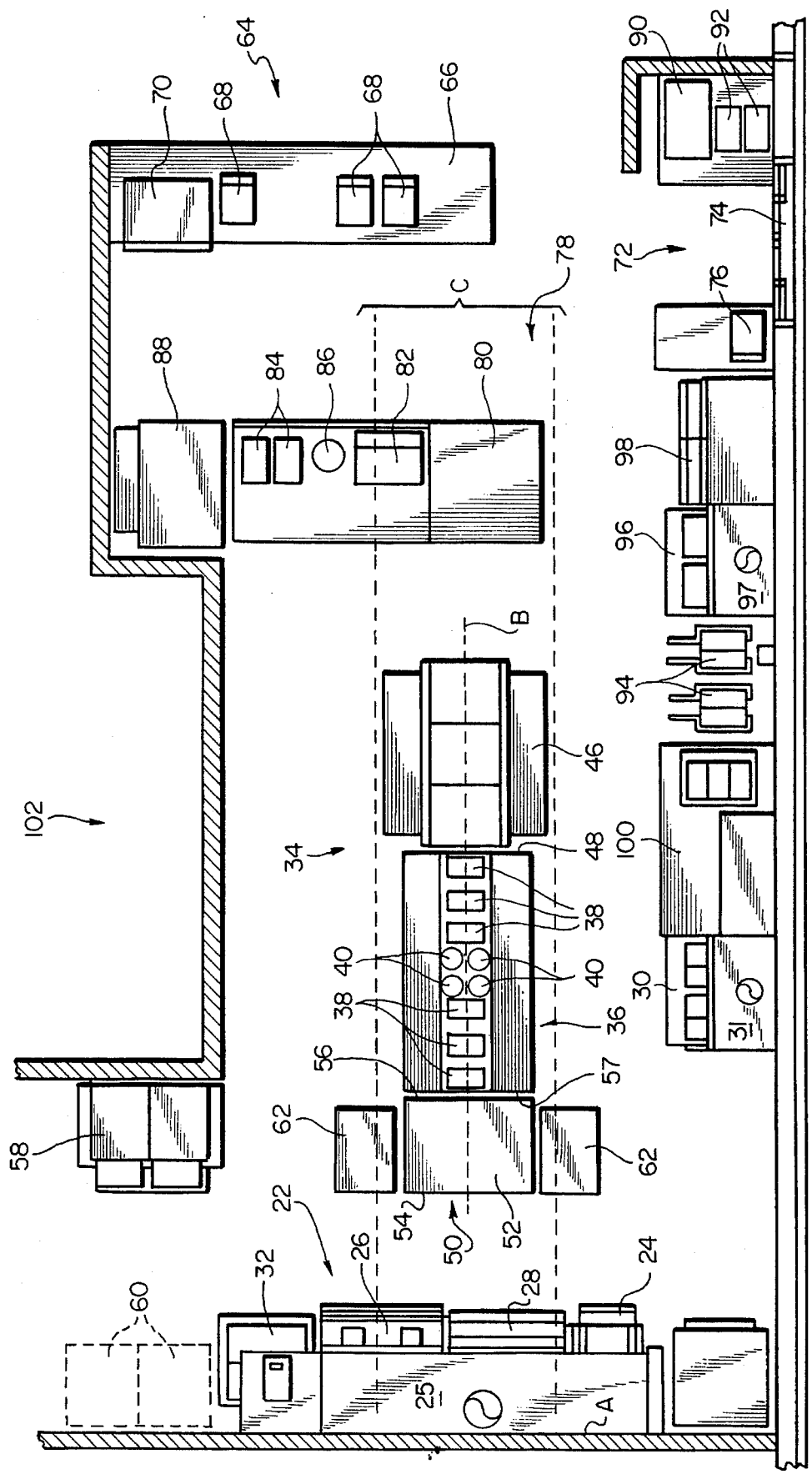
FIG. 2 is a plan view of an alternative embodiment of a kitchen according to the invention.
Figure 3:
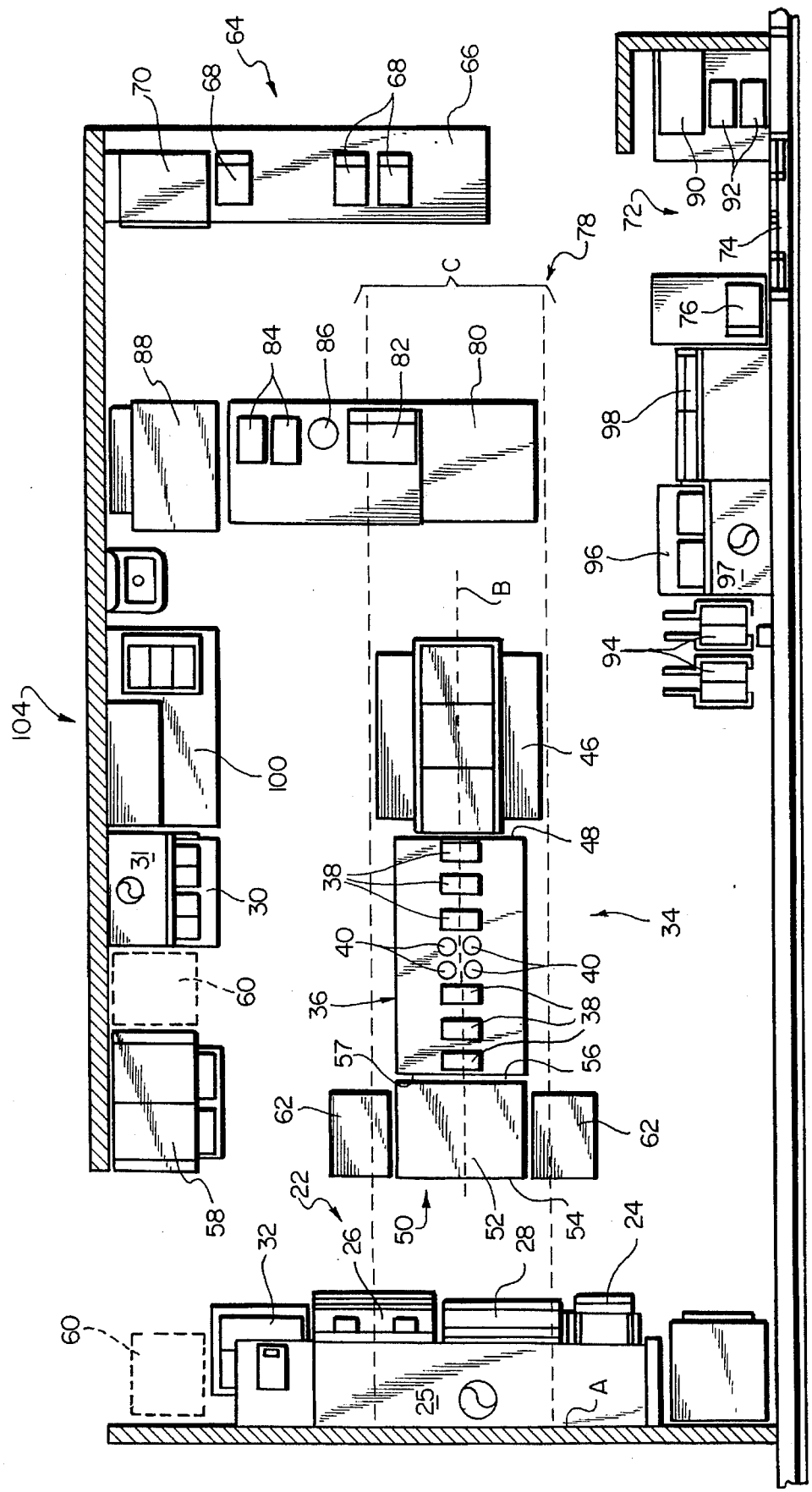
FIG. 3 is a plan view of another alternative embodiment of a kitchen according to the invention.

Referring to FIGS. 1–3, suitable vented hoods 25 and 31 are provided over cooking devices 24, 26, 28 and 30, respectively.

A cooked-food assembly area 34 for further processing and assembling the food items cooked in area 22 is spaced apart from food cooking area 22 and includes an elongated assembly table 36. Table 36 can include various condiment trays 38 for storing solid condiments such as lettuce, pickles, onions, or tomatoes as well as condiment containers 40 for storing various liquid condiments, such as mayonnaise, ketchup, mustard or tartar sauce, any of which can be suitably refrigerated, if desired. Assembly table 36 can also include a storage area for holding a supply of containers for assembling and storing therein individual meal-type cooked food items. In one preferred embodiment, table 36 includes opposed work areas 42 and 44 which can accommodate two or more groups of personnel working within area 34 on opposite sides of table 36. Trays 38 and containers 40 are located along the middle of table 36 provide access to trays 38 and containers 40 from either work area 42 or 44 thereby promoting efficient processing and handling of the cooked food items. In addition, assembly table 36 preferably is positioned along a line B or linear corridor C which is substantially normal to the linear arrangement (line A) of devices 24–30. Preferably, linear corridor C, if extended, intersects a portion of primary cooking area 22 including one or more cooking devices such as cooking devices 24, 26, 28 and 30, as illustrated in FIG. 1. The width of corridor C generally will be as about equal to the maximum width of the equipment located in assembly area 34. Alternatively, the food cooking device or devices within primary cooking area 22 can be positioned in a desired non-linear manner or array (not shown) where at least a portion of cooking area 22 is within extended corridor C. For example, the non-linear array could be V-shaped, C-shaped or any other array as desired. After being processed and assembled at table 36, the food items can be delivered to a wrapping table 46 where the food items are wrapped or packaged before being delivered to a customer. In a preferred embodiment, wrapping table 46 is positioned in corridor C at an end 48 of assembly table 36 which is spaced apart from food cooking area 22. This arrangement promotes efficient food handling by further separating the food cooking and assembly areas, 22 and 34 respectively, thus ensuring that personnel working within one area, such as food cooking area 22, are not impeded by personnel working in another area, such as assembly area 34.

Kitchen 20 also includes a cooked-food buffer area 50 which is intermediate food cooking area 22 and cooked-food assembly area 34 and which is proximally located to both areas 22 and 34. Buffer area 50 has a cooked-food buffer device 52 located therein which is used to hold a supply of food items after the food items have been cooked in area 22 and prior to subsequent processing and assembly in assembly area 34. Buffer device 52 can be any suitable device capable of holding cooked food items at elevated temperature for extended periods of time while maintaining the taste, texture, and appearance of the cooked food items. Device 52 is preferably the staging device disclosed in U.S. patent application Ser. No. 08/439,160, filed May 11, 1995 entitled "Cooked Food Staging Device and Method" which was filed concurrently with this application and which is assigned to the same party as the present application, the entire disclosure of which is hereby incorporated by reference.

Buffer device 52 includes a food inlet 54 and a food outlet 56 and is positioned such that food inlet 54 provides a passageway for personnel working in food cooking area 22 to insert cooked food items into the interior of device 52 and food outlet 56 provides a passageway for personnel working in cooked-food assembly area 34 to remove food items from the interior of device 52 for further processing and assembly in area 34. In the preferred embodiment, buffer device 52 is positioned at an end 57 of assembly table 36 which is proximally located to food cooking area 22. This arrangement facilitates efficient food handling by providing simultaneous access to device 52 for personnel working within food cooking area 22 and for personnel working within cooked-food assembly area 34.

Buffer device 52 includes a cabinet containing a plurality of discrete compartments (not shown), each bounded by an upper heated compartment surface and a lower heated compartment surface. The upper and lower compartment surfaces are constructed from a material having a high thermal conductivity, preferably from anodized aluminum. The previously cooked food items are held within the compartments until the food items are sold or otherwise disposed of. The air currents throughout the cabinet, if any, are limited because each of the compartments is segregated from the other compartments and has solid upper and lower surfaces as well as closed sidewalls and limited access doors, the combination of which limits air flow in the compartments. In addition, air currents within the compartments are limited because both the lower and upper surfaces of the compartments are heated, thereby minimizing regions of thermal gradients within the compartments. Consequently, device 52 can minimize the amount of moisture lost from the cooked food items, thereby protecting the appearance, taste, and texture of the cooked food items. In addition, device 52 can include a plurality of trays for containing the cooked food items. The trays have a height such that the top edges of the trays are at a predetermined vertical distance from the upper heated compartment surface when the trays are inserted into the compartments. By limiting the space between the top edges of the trays and the upper compartment surface in this manner, evaporation of liquid from the cooked food items is minimized, thereby protecting the appearance, taste, and texture of the cooked food items held in the device. In addition, the trays can be configured such that the length of the trays is less than but approximately equal to the depth of the compartments thereby enabling easy removal of the trays through food outlet 56.

Kitchen 20 can optionally include a bun toaster 58 and a bun rack 60 for storing buns to be toasted. Any device that is suitable for toasting buns can be used in accordance with the invention. The buns which are toasted within toaster 58 can be held within device 52 until used to fill a customer order or otherwise disposed of. Therefore, in the preferred embodiment bun rack 60 and bun toaster 58 are proximally located to both food cooking area 22 and cooked-food assembly area 34 to ensure efficient toasting and handling of the buns. For example, in the preferred layout embodiment shown in FIG. 1, rack 60 is located at one end of food cooking area 22 and toaster 58 is proximally located to rack 60. In addition, toaster 58 is preferably positioned so that it faces bun rack 60. Separate bun racks 62 can be provided for holding buns used in products which do not require toasted buns and can be located in or adjacent to corridor C. Racks 62 are proximally located to assembly area 34 to facilitate use of the buns stored therein in further processing and assembly of cooked food items within assembly area 34.

After a supply of food items is cooked in food cooking area 22, the food items are placed within buffer device 52 via food inlet 54 and are held within device 52 at an elevated temperature under conditions which maintain the taste, texture, and integrity of the cooked food items. Usually, a particular cooked food item, such as a hamburger patty, remains within device 52 until actual or anticipated customer demand requires the food stored therein. When such an order is placed, the appropriate food item is removed from within the buffer device 52 via food outlet 56 for further processing in assembly area 34. For example, in the case of a hamburger sandwich, the processing of the cooked hamburger patty to make the ordered sandwich product can include adding a sauce and other condiments to the patty and placing the patty within a bun-type product. Thereafter, the processed and assembled sandwich is wrapped at wrapping table 46 before being delivered to the customer. Under other circumstances, for example, when the customer demand rate is very low, food items held within device 52 beyond the prescribed holding period are destroyed and are not sold to customers. In order to ensure consistent high quality, each type of cooked-food item has a pre-determined maximum holding time during which the item can be held within device 52. Therefore, if the maximum holding time for a food item within device 52 expires before a customer orders a product using that food item, the food item is discarded.

Kitchen 20 can also include a customer interface area 64 which is preferably located at the front of kitchen 20, opposite food cooking area 22. Customer interface area 64 can include a counter 66 where a customer can place an order, and cash registers 68. A food display area 70 can also be provided on counter 66. Food display area 70 can be used to display food items which a customer may want to inspect prior to purchase in order to ensure the quality of the item. For example, if kitchen 20 provides salad products, the salad products can be displayed within food display area 70. Alternatively, if kitchen 20 provides fresh bakery products, such as pies and cakes prepared on site, food display area 70 can be used to display the fresh bakery products. Customer interface area 64 can also include a drive-through interface area 72 located along an exterior wall of kitchen 20, including a window 74 and a cash register 76, for taking and filling orders for customers who remain within their cars. In the preferred embodiment, drive-through interface 72 is positioned at the front of kitchen 20, spaced apart from and proximally locate to counter 66.

An order filling area 78 is provided intermediate cooked-food assembly area 34 and customer interface area 64. Order filling area 78 includes a pick-up table 80 proximally located to cooked-food assembly area 34 for holding cooked-food products which have been fully processed and assembled in assembly area 34. In this embodiment pickup table 80 is located within corridor C. Order filling area 78 also includes a variety of food dispensers for dispensing food items which do not require processing and assembly to fill a customer order. Thus, for example, order filling area 78 includes various drink dispensers, such as soda dispensers 82, coffee dispensers 84, iced tea dispensers 86, and milk-shake dispensers 88. In the preferred embodiment, dispensers 82–88 are arranged along a line parallel to counter 66 in customer interface area 64. In addition, when kitchen 20 includes drive-through interface area 72, order filling area 78 can include separate soda dispensers 90 and coffee dispensers 92 located near drive-through window 74 to facilitate filling orders placed at drive-through window 74. Order filling area 78 can also include fry racks 94, fryer 96 for cooking vegetable products, such as french fries, a suitable vented hood 97 over fryer 96 and a keeper 98 for holding the vegetable products after they have been fried and drained. In the preferred embodiment, fryer 96, fry racks 94, and keeper 98 are located near both counter 66 and drive-through window 74 to facilitate filling orders for both walk-in and drive-through customers. Thus, in the layout shown in FIG. 1, fryer 96, fry racks 94, and keeper 98 are arranged in a line which is substantially adjacent drive-through counter 74 and which is near to but spaced-apart from counter 66.

The above-described devices and areas within kitchen 20 ordinarily provide all the food products offered by a quick service restaurant on a prolonged, daily basis. Some quick service restaurants, however, occasionally offer seasonal or promotional food products, for a limited time, which typically differ substantially from the food products offered on a prolonged basis. For example, a quick service restaurant may offer fajitas, in addition to sandwich-type and meal-type products. Kitchen 20, therefore, can also include a separate preparation area 100 for preparing such seasonal or promotional food products. In the preferred embodiment shown in FIG. 1. preparation area 100 is located near order filling area 78 and is most preferably adjacent fry racks 94.

FIG. 2 illustrates an alternative embodiment of a kitchen 102 according to the invention. Kitchen 102 includes the same work areas as kitchen 20, including food cooking area 22, cooked-food buffer area 50, and cooked-food assembly area 34. Kitchen 102 also includes the same devices as kitchen 20, such as grills 24, 26 and 28, buffer device 52 and assembly table 36. Kitchen 102 differs from kitchen 20 primarily in the location of fryer 30 which in kitchen 102 is positioned closer to vegetable fryers 96. Fryer 30 is also located near buffer device 52 so that foods cooked in fryer 30 can be readily transferred to buffer device 52 prior to being further processed and assembled in cooked food assembly area 34. By locating fryer 30 close to vegetable fryers 96, the kitchen personnel who operate vegetable fryers 96 can also operate fryer 30. Kitchen 102 thus promotes an efficient use of personnel by consolidating similar cooking devices, such as fryer 30 and vegetable fryers 96, in a single location.

FIG. 3 illustrates another embodiment of a kitchen 104 according to the invention. Kitchen 104 includes the same work areas and the same devices as kitchens 20 and 102. Kitchen 104 differs from kitchens 20 and 102 in the location of the optional bun toaster 58, fryer 30, and special foods preparation area 100. Unlike kitchens 20 and 102, in kitchen 104 optional bun toaster 58, fryer 30, and special foods preparation area 100 are positioned along a wall opposite vegetable fryers 96. In addition, bun toaster 58 is rotated to face cooked-food assembly area 34. Bun toaster 58 is still located near bun racks 60 and buffer device 52 to promote efficient cooking and handling of toasted buns. Similarly, fryer 30 is still located near buffer device 52 so that foods cooked in fryer 30 can be readily transferred to buffer device 52 prior to being further processed and assembled in cooked food assembly area 34. By relocating the positions of devices 58, 30 and 100, kitchen 104 promotes an efficient use of space where the floor space within the restaurant is limited.

Kitchens 20, 102, and 104 are effectively and efficiently used to produce consistently high quality cooked food items which require further processing and assembly after being cooked. Initially, a supply of cooked food items is cooked in food cooking area 22 in advance of customer orders. The types and numbers of the various food items cooked before customer orders varies depending on the operational history of the restaurant. For example, in a given restaurant the customer demand for hamburger sandwich products may historically be greater than the customer demand for chicken or fish fillet sandwich products. In this case, the number of hamburger patties cooked in grills 24 and 26 would be larger than the number of chicken or fish fillets cooked in fryer 30. After the food items are cooked in food cooking area 22, kitchen personnel place the cooked food items within buffer device 52 via food inlet 54. The cooked food items stored within buffer device 52 are held at an elevated temperature for a period of time under conditions that maintain the taste, texture, and appearance of the cooked food items. Thereafter, when the kitchen personnel receive an order from a customer for a product including one of the cooked food items stored within device 52, the ordered item is transferred from device 52 to cooked-food assembly area 34 for further processing and assembly. For example, when a customer orders a hamburger sandwich, kitchen personnel working within cooked-food assembly area 34 remove a previously cooked hamburger patty from device 52 via food outlet 56 and transfer the hamburger patty to assembly area 34. At assembly table 36, the cooked food item is further processed and assembled. Thus, for example, the hamburger patty is placed on a bun and the appropriate condiments stored in condiment trays 38 and condiment containers 40 are added to the patty-bun combination to form the finished food item. In addition, if the ordered product requires packaging, the finished food item is transferred to wrapping table 46 for packaging. Finally, the finished food item is delivered to the customer.

Kitchens 20, 102, and 104 thus bridge the difference between a variable customer demand rate and a limited production rate to provide finished cooked food items which are safe, palatable, and appealing. Kitchens 20, 102, and 104 provide a supply of cooked food items needed to satisfy a high customer demand rate because a supply of cooked-food items is cooked in food cooking area 22 in advance of customer orders. Moreover, because the supply of cooked food items is stored within buffer device 52 under conditions which maintain the taste, texture, and appearance of the cooked food items, kitchens 20, 102, and 104 provide finished cooked food items which are safe and palatable. In addition, because the final processing and assembly of the cooked food items, such as adding refrigerated condiments to the food items, is done in assembly area 34 in response to customer orders, kitchens 20, 102, and 104 provide finished cooked food items which are appealing.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A kitchen for a commercial restaurant, comprising:

a food cooking area for cooking food items requiring subsequent processing including at least one final assembly step after cooking and before delivery to a customer, said food cooking area having at least one food cooking device contained therein;

a cooked-food processing area spaced apart from the food cooking area for assembling into individual sandwich portions the food items cooked in the food cooking area after the food items have been cooked; and a cooked-food buffer area intermediate said food cooking area and said cooked-food processing area and proximally located to both the food cooking area and the cooked-food processing area, said cooked-food buffer area having a cooked-food buffer device located therein capable of holding a supply of the cooked food items at elevated temperature for extended periods of time while maintaining the taste, texture and appearance of the food items prior to subsequent processing, said cooked-food buffer device comprising a holding cabinet including a food inlet, a food outlet, and an interior for holding food items, said buffer device being positioned such that said food inlet provides a passageway for an operator in said food cooking area to insert cooked food items into the interior of said cabinet and said food outlet provides a passageway for an operator in said cooked-food processing area to remove the cooked food items from the interior of said device.

2. The kitchen of claim 1 wherein said at least one food cooking device includes a device selected from the group consisting of a grill, an oven and a fryer.

3. The kitchen of claim 1 wherein said food cooking area further contains therein a freezer for storing food items to be cooked.

4. The kitchen of claim 1 further comprising a plurality of cooking devices, each said cooking device having a front and said cooking devices being linearly arranged in side-by-side relation in said food cooking area, said front of each said cooking device facing said food inlet of said cooked-food buffer device.

5. The kitchen of claim 4 further comprising an elongated assembly table in said cooked-food processing area, one end of said table facing said food outlet of said cooked-food buffer device.

6. The kitchen of claim 5 wherein said elongated assembly table is positioned such that a straight corridor extending along the length of said table extends through said buffer device and at least one of said cooking devices, said corridor being substantially normal to the linear arrangement of said cooking devices.

* * * * *